(12) United States Patent
Daoud

(10) Patent No.: US 6,309,240 B1
(45) Date of Patent: *Oct. 30, 2001

(54) TERMINAL STRIP FOR MAINTAINING TIP/RING ORIENTATION STANDARDS

(75) Inventor: Bassel H. Daoud, Parsippany, NJ (US)

(73) Assignee: Avaya Technology Corp., Basking Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/218,263

(22) Filed: Dec. 21, 1998

(51) Int. Cl.[7] ............................. H01R 4/24; H01R 4/26; H01R 11/20
(52) U.S. Cl. ................................. 439/403; 439/941
(58) Field of Search .................. 439/403, 888, 439/721, 797, 78, 796, 723, 402, 941, 404

(56) References Cited

U.S. PATENT DOCUMENTS

| 3,611,264 | 10/1971 | Ellis . |
| 4,662,699 | 5/1987 | Vachhani et al. . |
| 4,793,823 | 12/1988 | Cozzens et al. . |
| 5,199,899 | * 4/1993 | Ittah ..................................... 439/403 |
| 5,240,432 | 8/1993 | Daoud . |
| 5,637,011 | 6/1997 | Meyerhoefer et al. . |
| 5,860,829 | 1/1999 | Hower et al. . |
| 6,065,994 | * 5/2000 | Hashim et al. ...................... 439/404 |

OTHER PUBLICATIONS

Technical Data Sheet of A.C. Egerton Limited, related to Mini Rocker Cross Connection Cabinets.

* cited by examiner

Primary Examiner—Khiem Nguyen
Assistant Examiner—Javald Nasri
(74) Attorney, Agent, or Firm—StrooCk & Stroock & Lavan LLP

(57) ABSTRACT

An electrically conductive terminal strip for a dual sided wiring connector for maintaining a tip-ring telephone wire orientation standard. The terminal strip is disposed of within a dual sided connector which is mounted on a hinged surface. When the hinged surface is rotated about the hinge axis, the tip-ring orientation is preserved.

20 Claims, 5 Drawing Sheets

FIG. 1
FIG. 2
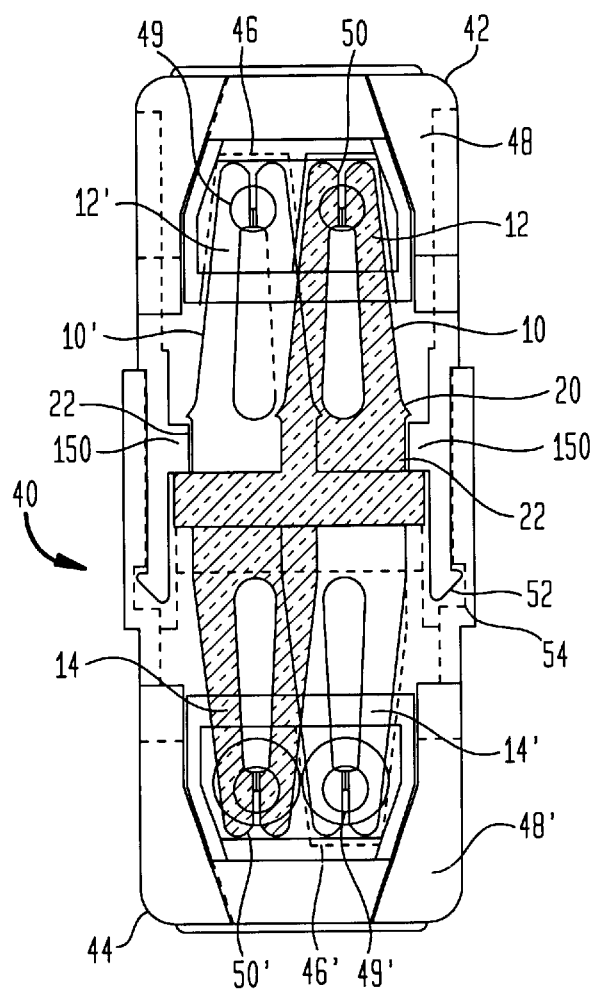
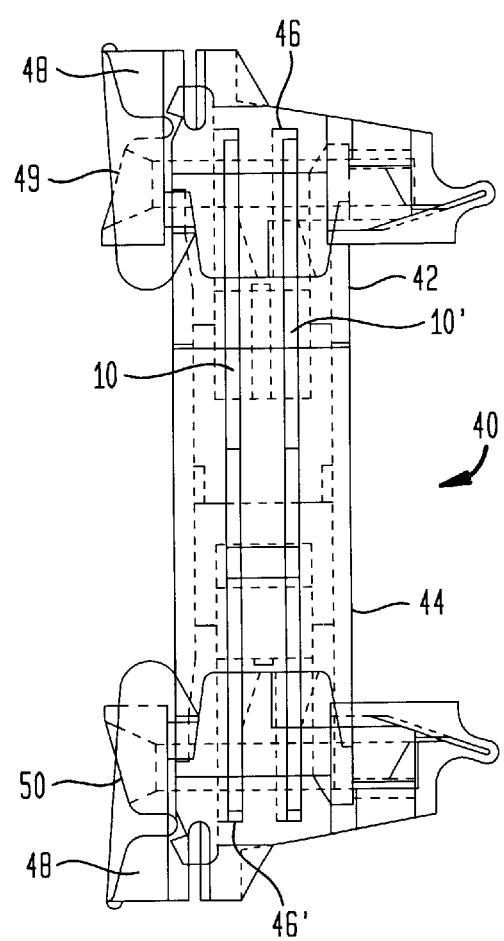

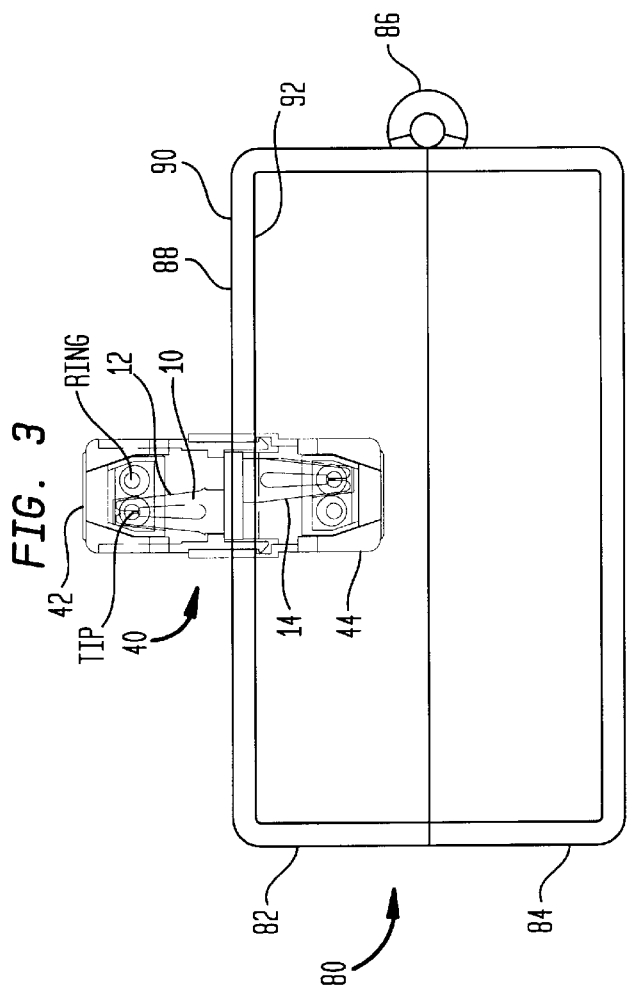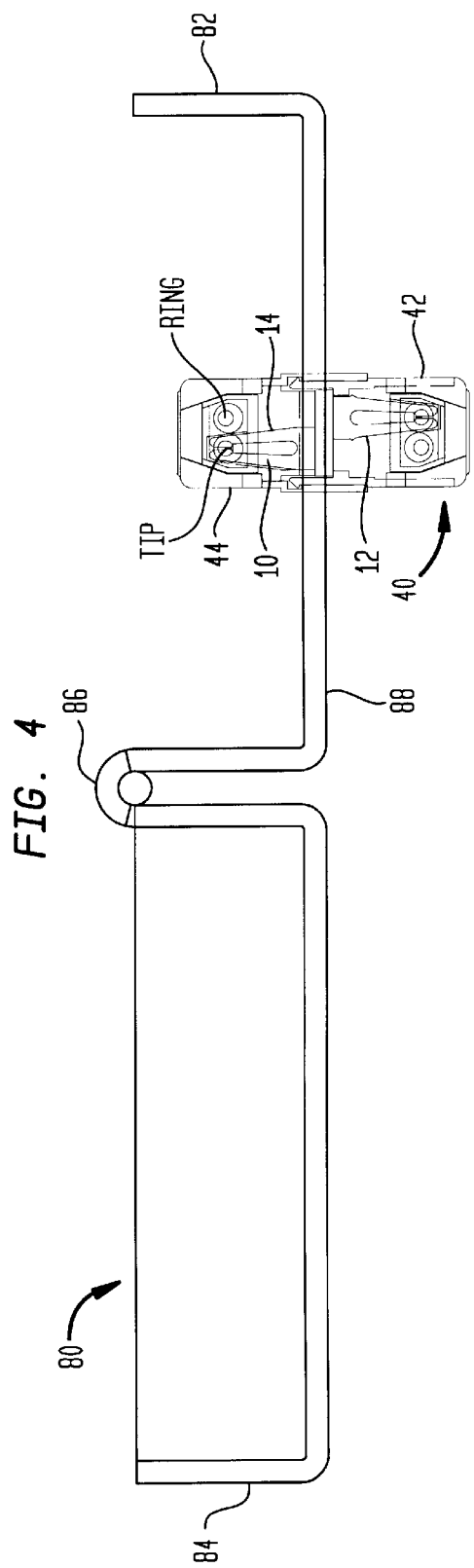

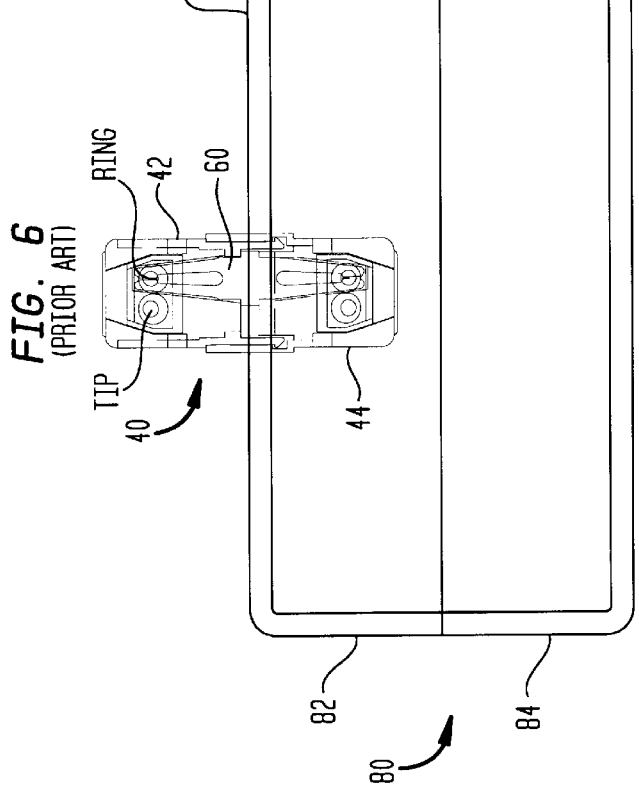
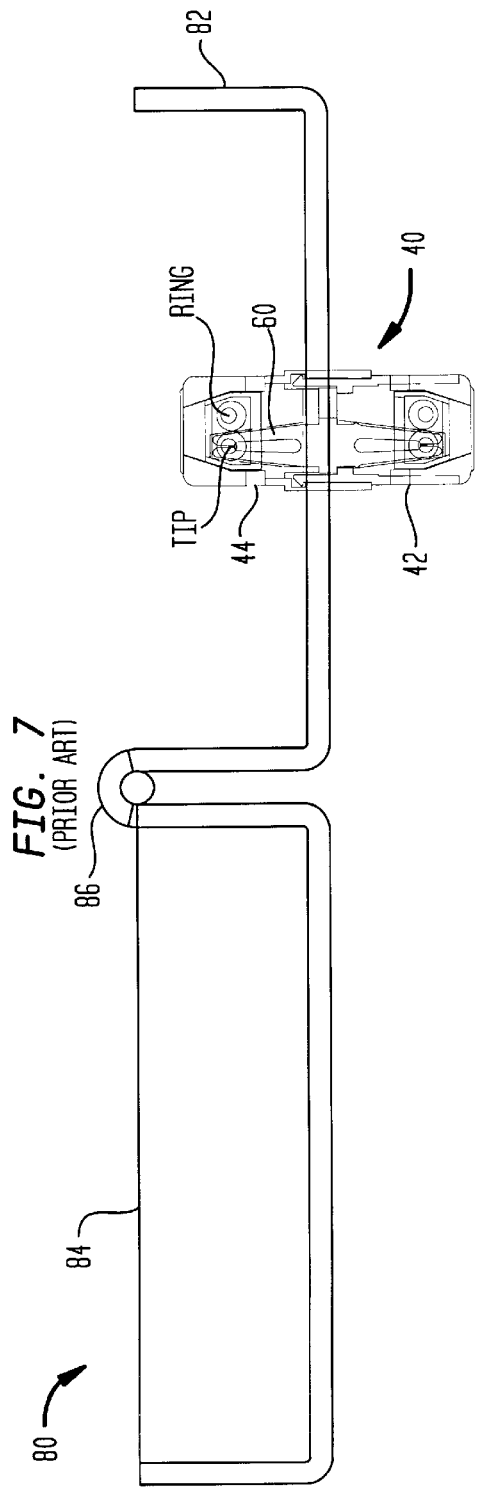

TERMINAL STRIP FOR MAINTAINING TIP/RING ORIENTATION STANDARDS

FIELD OF THE INVENTION

This invention relates to the field of telephone wire connector blocks and distribution systems, and specifically for an electrically conductive terminal strip for use in a dual sided connector for the purpose of maintaining the tip-ring orientation standard and facilitating user installation.

BACKGROUND OF INVENTION

Telephone lines, which are carried by electrical conductors known as tip ring wire pairs, are generally aggregated at a particular point in a building prior to being distributed and connected to various types of telephone equipment, such as, for example, telephones, fax machines, modems etc. As the tip ring pairs generally enter the building as part of a multi-conductor cable, the aggregated tip ring wire pairs must first be broken out from the cable into individual wire pairs. This is normally accomplished in a wiring junction box known as, for example, a building entrance protector (BEP), or network interface unit (NIU). Within such devices the individual telephone line tip ring pairs are separated from the cable, individually connected to a connector block, and made available for further electrical connection and distribution. Usually there is a protector device inserted between the telephone and central office, or network side of the telephone line and the customer equipment or terminal side of the telephone line to protect the telephone and user, or other equipment connected to the telephone line, from hazardous overvoltages induced in the telephone network or in the cables passing between the telephone central office and the building within which the line is terminated.

In a typical arrangement, the telephone lines coming from the network are first wired to a protector field, which is an array of connectors for receiving the protector device, which is in turn hard wired to a first connector block which provides a first test point for testing the telephone line connections between the building and telephone central office. This first terminal block is hard wired to a multi pair connector, most typically a twenty-five pair connector of the RJ21 type, for further connection to an array of customer bridges which are also hard wired and connectorized via a mating RJ21 connector. The use of a customer bridge permits a subscriber to disconnect terminal equipment from a telephone line so that subscriber can isolate troubles on the line as originating in the telephone network, or on the terminal equipment side of the telephone line. An example of such an arrangement is shown in U.S. Pat. No. 5,363440, dated Nov. 8, 1994, the disclosure of which is incorporated herein by reference. U.S. Pat. No. 5,363,440, depicts a multi-layered network interface unit which results in size economies due to the fact that the customer bridge connector block is hingeably connected to the telephone network protector array field so that rather than placing these two arrays side by side they can be mounted in overlying relationship, resulting in a saving of space.

Typical connectors used in such applications are insulation displacement connectors (IDCs) of the type requiring a tool, such as the ubiquitous 66-type punch down connector, or tool-less IDC connectors such as the push cap SC-99 type connector sold by Lucent Technologies, Inc. or the mini-rocker type IDC sold by A.C. Egerton, LTD. Other connectors for use in telephony applications are described in U.S. Pat. No. 4,662,699, dated May 5, 1997, to Vachhani, et al., and U.S. Pat. No. 3,611,264, dated Oct. 5, 1971, to Ellis.

Additionally, there are known dual sided connector blocks for use in such junction boxes and/or distribution fields. These known terminal blocks consist of a first wiring connector on one side of the connector block, and a similar or different, electrically connected wiring connector on the other side of the block. Because the terminals in such blocks corresponding to either the tip or ring telephone wire on one side of the connector are reversed when the block is accessed from the other side, installers tend to make improper connections, thus, reversing the polarity of the telephone wires and causing the associated telephone equipment to malfunction. This greatly diminishes the flexibility and ease of use of such connector blocks.

SUMMARY OF THE INVENTION

The present invention is directed at overcoming the shortcomings of the prior art. The invention comprises an electrically conductive terminal strip for use in a dual sided connector block for maintaining the tip-ring orientation standard.

Positioned on the first side of the connector block is an array of terminal connectors capable of receiving individual wires which are generally part of individual tip ring wire pairs of telephone lines. Each of the terminal connectors in this array is electrically connected to a respective connector found in a similarly configured connector array on the opposite side of the connector block via an electrically conductive terminal strip, thus creating an electrical connection between each terminal connector on one side of the block and a respective matching, corresponding connection on the opposite side of the connector block. The connectors on both sides of the block may be, for example insulation displacement type connectors (IDCs), having within each connector a portion of the double sided IDC terminal strip of the present invention. While it is preferred to use tool-less IDC connectors, it is not necessary to do so, as punch down IDC connectors may also be used, as well as any known wiring connection point, such as, for example, binding posts, spring clips, screw type connectors, and the like.

As is presently known, dual-sided terminal strips are configured such that a terminal strip corresponding to the tip or ring wire on one side of the connector block will be of reverse orientation when the connector block is accessed from the other side. Installers are trained to connect telephone wires based on the tip-ring orientation standard. Therefore, although warnings are placed on the connector or the associated junction box, the reverse orientation has the disadvantage of leading to installer errors and eventual telephone equipment failure. Consequently, a dual-sided terminal strip designed so that the tip-ring orientation is maintained on both sides of the connector block has the advantage of decreasing installer errors and increasing the ease and speed of telephone wire installation.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views:

FIG. 1 is a front view of a dual sided tool-less insulation displacement connector in accordance with the present invention;

FIG. 2 is a side view of the connector of FIG. 1;

FIG. 3 is a bottom view of a multi-layered foldable connector box in the closed or folded position having mounted to it a connector in accordance with the present invention;

FIG. 4 is a bottom view of the connector box of FIG. 3 in the open or unfolded position;

FIG. 6 is a bottom view of the connector box of FIG. 4 in the closed position having mounted to it a connector of the prior art;

FIG. 7 is a bottom view of the connector box of FIG. 6 in the open position.

DETAILED DESCRIPTION OF THE PREFERRED EMBODIMENTS

Figure 5:
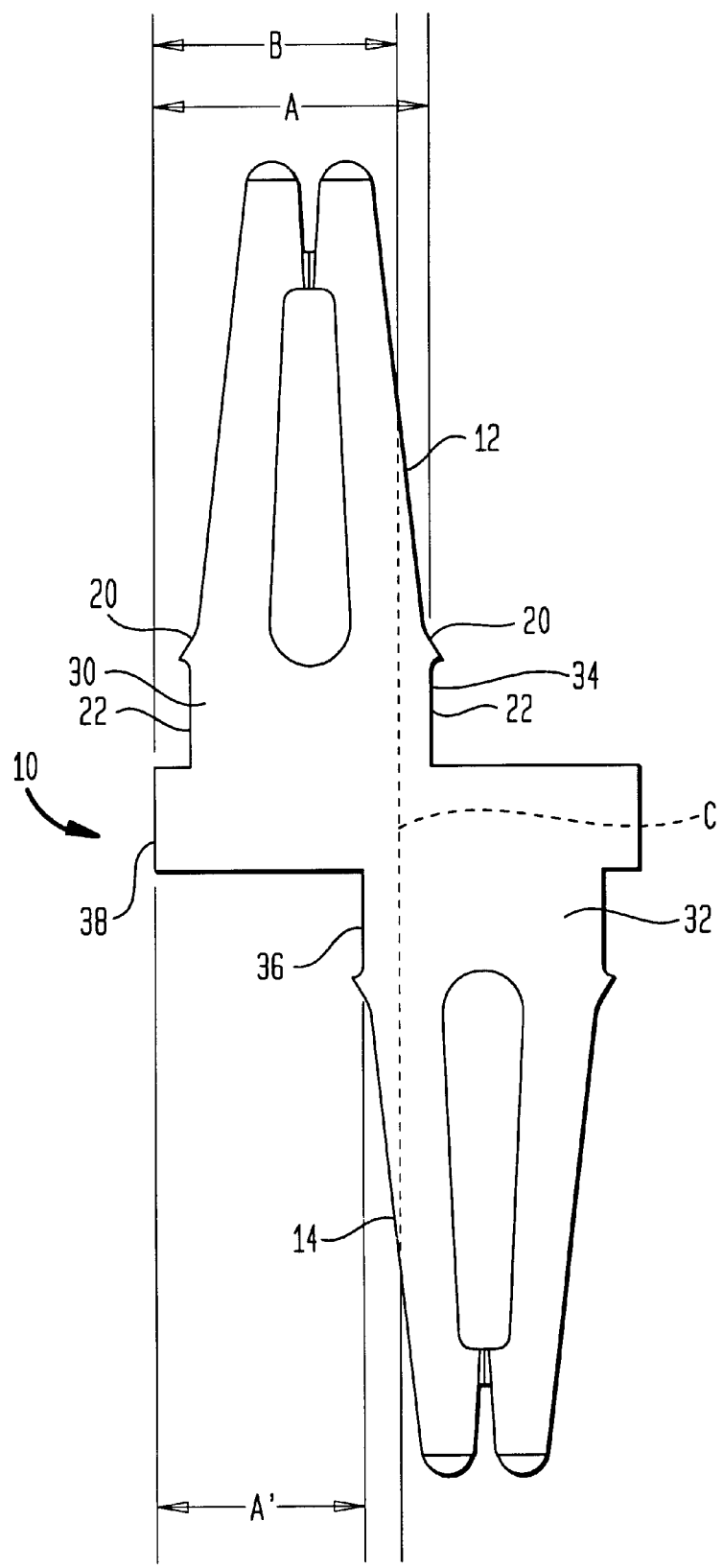
FIG. 5 is a front view of the dual sided terminal strip of the present invention.

With reference to FIGS. 1 and 2, a dual sided tool-less IDC connector 40 for use with the present invention comprises an upper connector portion 42 and a matching lower connector portion 44. Upper connector portion 42 and matching lower connector portion 44 are each comprised of, for example, a molded plastic housing portion 46, 46' for retaining therein a portion of a pair of electrically conductive terminal strips 10, 10' in accordance with the present invention.

Referring again to FIG. 1, terminal strips 10, 10' are preferably removeably insertable into upper connector portion 42 and matching lower connector portion 44. As seen in FIG. 1, in a preferred embodiment, first wiring point 12 of terminal strip 10 is provided with sloped region 20 which, upon insertion upward into a downwardly facing housing portion 46 of upper connector portion 42, extends between snap fit protrusions 150 of upper connector portion 42 so as to facilitate securement of terminal strip 10 within upper connector portion 42 through the mating engagement of snap fit protrusions 150 and snap fit recesses 22 of terminal strip 10. Second wiring point 14 extends beyond the bottom end of upper connector portion 42 and is removeably insertable into housing portion 46 of matching lower connector portion 44. Upper connector portion 42 and matching lower connector portion 44 may be secured to one another by any means of securement known in the art, such as, by way of non-limiting example, adhesive, friction fit, screws, and the like. The means of securement having the effect of retaining a pair of terminal strips 10, 10' within housing portions 46, 46'.

Referring now to FIGS. 1 and 2, upper connector portion 42 and matching lower connector portion 44 each have a push down portion 48, which contains a pair of wire insertion holes 49, 50 for insertion therein of a respective single wire conductor of a tip ring pair of a telephone line. Wire insertion holes 49, 50 of upper connector portion 42 are electrically connected to wire insertion holes 49', 50' of matching lower connector portion via a pair of internal dual sided metallic IDC terminal strips 10, 10' in accordance with the present invention, discussed further below. Thus, by way of non-limiting example, an electrical conductor (not shown) inserted into and retained within wire insertion hole 49 of upper connector portion 42 will be electrically connected via terminal strip 10 to a conductor (not shown) inserted into and retained within wire insertion hole 49' of matching lower connector portion 44.

Referring now to FIGS. 3 and 4, dual sided IDC connector 40 is preferably mounted on a reversible surface such as, for example, double sided flat base 88 of multi-layered foldable connector box 80. Double sided flat base 88 has a first side 90 and a second side 92 and; is hingeably rotable about the axial line of hinge 86. As seen in FIG. 3, upper connector portion 42 is accessible when double sided flat base 88 is in the closed or folded position. Conversely, as seen in FIG. 4, matching lower connector portion 44 is accessible only when double sided flat base 88 is in the open or unfolded position. With further reference to FIGS. 6 and 7, in connectors having terminal strips presently known in the art 60 accessed from the open position, the tip ring orientation of the wire insertion holes is reversed upon opening or unfolding the mounting surface. Terminal strip 10 of a preferred embodiment of the present invention, as discussed further below, eliminates this problem.

Referring again to FIGS. 3 and 4, a dual sided tool-less IDC connector 40 of the mini-rocker type, allows electrical connection of two tip ring pairs of wires (not shown) across double sided flat base 88. Tip and ring wires each have opposite polarities and correspond to different functions of telephone equipment. Because the polarity of the tip and ring wires are opposite and operate different functions of telephone equipment, improper installation may result in telephone equipment malfunction. Therefore, preservation of the tip ring orientation is critical. Normally, tip ring pairs are connected according to an orientation standard commonly known as "ring, right, red." For example, as seen in the preferred embodiment of FIGS. 3 and 4, the orientation is met by positioning tip wire insertion hole 49 adjacent to and left of ring wire insertion hole 50. By providing uniformity, the tip ring orientation standard enables installers to properly connect wires without reversing their polarities. However, as was discussed previously, in connectors having terminal strips presently known in the art (60, FIGS. 6 and 7) accessed from the open position (FIG. 7), the tip ring orientation standard of the wire insertion holes is reversed, thereby increasing the chance of installer error.

Figure 8:
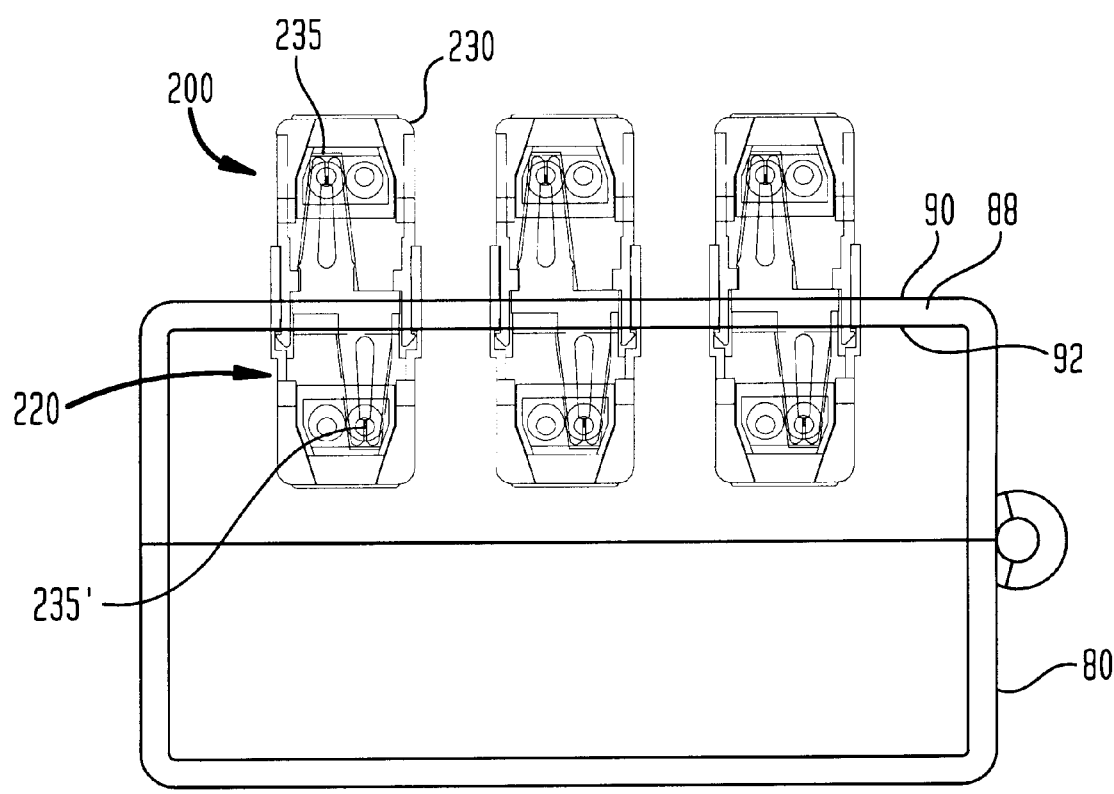
FIG. 8 is a bottom view of a multi-layered foldable connector box in the closed or folded position having mounted to it an array of connectors in accordance with the present invention.

Referring now to FIG. 5, terminal strip 10 of a preferred embodiment of the present invention is shown in greater detail. As seen in FIG. 5, terminal strip 10 comprises a first wiring point 12 extending from central region 11 in a first direction and a second wiring point 14 electrically connected to first wiring point 12 and extending from central region 11 in a second direction substantially opposite to said first direction. Wiring points 12 and 14 are formed on a first and second terminal strip portion 30, 32, respectively. Further, the first terminal strip portion 30 has a first inner edge 34 and the second terminal strip portion 32 has a second inner edge 36. As shown in FIG. 5, a distance A between a first outer edge 38 of central region 11 and first inner edge 34 of first terminal strip portion 30 is greater than or equal to the distance B between first outer edge 38 and a center line C of central region 11. In addition, the distance A' between first outer edge 38 and second inner edge 36 of second terminal strip portion 32 is less than or equal to the distance B' between first outer edge 38 and the center line C. Thus, depending upon the particular embodiment of the invention, the first and second inner edges are either aligned with the center line or overlap one another. In addition, unlike presently known terminal strips (60, FIGS. 6 and 7), terminal strip 10 is provided with first wiring point 12 offset from second wiring point 14. This offset feature is accomplished by positioning first wiring point 12 in a first quadrant on an x-y plane and positioning second wiring point 14 in a second quadrant diagonal to said first quadrant. Preferably, the horizontal distance between the first wiring point 12 and second wiring point 14 is equal to the distance between wire insertion hole 49 and wire insertion hole 50 of either upper connector portion 42 or matching lower connector portion 44. In the preferred embodiment of FIGS. 3 and 4, for example, the offset feature of terminal strip 10 maintains the tip ring orientation standard when dual sided IDC connector 40 mounted on hingeably rotable dual sided surface 88 of connector box 80 is rotated about the axis of rotation of hinge 86 (FIGS. 3 and 4). This greatly simplifies installation of tip ring pairs of telephone wires and assists in decreasing installer errors. Thus, the terminal strip of the present invention may be flexibly deployed in numerous connector types. Moreover, the present invention can be included in connector arrays on terminal blocks, as depicted in FIG. 8, for ease of mounting multiple connectors in a particular installation. As shown, a first array 200 and a second array 220 of connectors may be mounted on flat base 88. Each connector 230 in the respective arrays 200, 220 has a pair of wiring points 235, 235' with an electrical connection connecting each wiring point to a respective single wiring point of a matching connector. Further, such connector blocks may be readily deployed in telephone wire junction boxes such as, for example, network interface units (NIUs) or building entrance protectors (BEPs).

While the preferred embodiment shown above depicts the terminal strip as part of a mini-rocker type connector, one skilled in the art will recognize that such a terminal strip may be readily modified for use in other connector types, such as the ubiquitous 66-type punch down connector, a tool-less push cap IDC such as the SC-99 sold by Lucent Technologies, Inc., and other tool requiring or tool-less connectors known in the art.

In all embodiments, terminal strip 10 may be formed of any commonly known conductive metal or electrical conductor known in the art and suitable for use in such terminals, such as, for example, platinum washed phosphor bronze, or beryllium-copper alloy or other material, metal or alloy combining good electrical conductivity with sufficient mechanical strength and resilience. Similarly, dual sided IDC connector 40 is preferably formed of a molded synthetic resinous material with good insulating properties and mechanical strength. The specific materials utilized in constructing dual sided IDC connector 40 are an application specific matter of design choice within the knowledge of the person of skill familiar with connectors utilized in the telephony art. Moreover, the specific means of affixing terminal strip 10 within dual sided IDC connector 40 need not be solely by snap fitting as described above, but by numerous methods of affixation known in the art, such as adhesives, friction fitting, integral molding, and the like, depending on whether ready removal and re-insertion of the terminal is required, as a matter of application specific design choice. In addition, the specific type of wiring points utilized are application specific and need not solely be of the tool-less IDC connector type, but may also be of a wire wrap type, a spring clip type, a binding post type or any other type of wiring point or connector known in the art.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. An electrically conductive terminal strip for a dual sided wiring connector, comprising:
    a first wiring point on a first terminal strip portion extending in a first direction from a central region of said terminal strip, said first terminal strip portion having a first inner edge;
    a second wiring point on a second terminal strip portion extending from said central region in a second direction substantially opposite to, parallel to, and offset from said first direction, said second terminal strip portion having a second inner edge; and
    wherein said central region has a first outer edge located nearest to said first terminal strip portion and the distance between said first outer edge and said first inner edge of said first terminal strip portion is greater than or equal to the distance between said first outer edge and a center line of said central region and the distance between said first outer edge and said second inner edge of said second terminal strip portion is less than or equal to the distance between said first outer edge and said center line.

2. The terminal strip of claim 1, wherein said wiring points of said terminal strip further comprise a wire retention region for stripping insulation from and retaining therein an electrical conductor.

3. The terminal strip of claim 2, further comprising means for affixing said terminal strip within a double sided tool-less insulation displacement connector.

4. The terminal strip of claim 2, further comprising means for removeably snap fitting said terminal strip in a double sided tool-less insulation displacement connector.

5. The terminal strip of claim 4, wherein said snap fitting means comprises a set of detents formed in said terminal strip for mating engagement with a set of protrusions formed in a terminal housing portion of said double sided insulation displacement connector.

6. A terminal strip, comprising:
    a first wiring point having a first inner edge and extending in a first direction, wherein the distance between a first outer edge of said terminal strip located nearest to said first wiring point and said first inner edge is greater than or equal to the distance between said first outer edge and a center line of said terminal strip;
    a second wiring point having a second inner edge, said second wiring point being electrically connected to said first wiring point and extending in a second direction substantially opposite to said first direction, wherein the distance between said first outcry edge and said second inner edge is less than or equal to the distance between said first outer edge and said center line; and
    said first wiring point is positioned in a first quadrant on an x-y plane and said second wiring point is positioned in a second quadrant diagonal to said first quadrant on said x-y plane, such that when said terminal strip is rotated 180° about an axis parallel to a z-axis orthogonal to said x-y plane said first wiring point is positioned in said second quadrant and said second wiring point is positioned in said first quadrant.

7. A dual sided wiring connector, comprising:
    an upper connector portion, having a first wiring point of a first terminal strip and a first wiring point of a second terminal strip disposed therein;

a lower connector portion, having a second wiring point of said first terminal strip and a second wiring point of said second terminal strip disposed therein; and wherein said respective second wiring points of said first and second terminal strips are electrically connected to said respective first wiring points of said first and second terminal strips and wherein a central region of each said first and second terminal strips has a first outer edge located nearest to said first wiring point and the distance between said first outer edge and a first inner edge of said first wiring point is greater than or equal to the distance between said first outer edge and a center line of said central region and the distance between said first outer edge and a second inner edge of said second wiring point is less than or equal to the distance between said first outer edge and said center line.

8. The dual sided connector of claim 7, wherein said wiring points of said connector are insulation displacement type wiring points.

9. The dual sided connector of claim 7, wherein said wiring points of said connector are tool-less insulation displacement type wiring points.

10. The dual sided connector of claim 7, wherein said connector is a tool-less insulation displacement connector.

11. A dual sided connector block, comprising:
a rotatable substantially flat base having a first side and a second side opposite said first side, said first side accessible when said substantially flat base is in a first position and said second side accessible when said substantially flat base is rotated 180° to a second position;
a first array of connectors on said first side, each connector having a first tip wiring point and a first ring wiring point;
a second array of connectors on said second side, each connector having a second tip wiring point and a second ring wiring point; and
an electrical connection connecting said first tip wiring point of each connector of said first array with said second tip wiring point of a matching connector of said second array, and an electrical connection connecting said first ring wiring point of each connector of said first array to with said second ring wiring point of a matching connector of said second array;
such that when said substantially flat base is in said first position said first tip and ring wiring points of said connectors of said first array are positioned in a standard orientation and when said substantially flat base is in said second position said second tip and ring wiring points of said connectors of said second array are positioned in said standard orientation.

12. The connector block of claim 11, wherein said connectors of said first and second array are insulation displacement connectors.

13. The connector block of claim 11, wherein said connectors of said first and second array are tool-less insulation displacement connectors.

14. The connector block of claim 11, wherein said electrical connection is formed via an electrically conductive terminal strip.

15. The connector block of claim 14, wherein said terminal strip comprises a first wiring point on a first terminal strip portion extending in a first direction from a central region of said terminal strip and a second wiring point on a second terminal strip portion extending from said second region in a second direction substantially opposite to, parallel to, and offset from said first direction.

16. The connector block of claim 15, wherein said wiring points of said terminal strip further comprise a wire retention region for stripping insulation from and retaining therein an electrical conductor.

17. The connector block of claim 11, further comprising means for mounting said connector block to a surface.

18. The connector block of claim 17, wherein said surface is a portion of a wiring junction box.

19. The connector of claim 18, wherein said junction box is a building entrance protector.

20. The connector of claim 18, wherein said junction box is a network interface unit.

* * * * *